(12) United States Patent
Liao

(10) Patent No.: US 6,866,568 B1
(45) Date of Patent: Mar. 15, 2005

(54) CIRCULAR SAW

(76) Inventor: Juei-Seng Liao, No. 396, Yung-Ming St., Ta-Li City, Taichung Hsien (TW)

( * ) Notice: Subject to any disclaimer, the term of this patent is extended or adjusted under 35 U.S.C. 154(b) by 0 days.

(21) Appl. No.: 10/783,277

(22) Filed: Feb. 20, 2004

(30) Foreign Application Priority Data

Oct. 30, 2003 (TW) ........................................ 92219290 U

(51) Int. Cl.$^7$ ................................................ B24B 7/00
(52) U.S. Cl. ......................... 451/69; 451/280; 451/360; 83/490; 125/13.01
(58) Field of Search ............................ 451/11, 69, 280, 451/358, 360, 359, 411, 344, 236, 342; 125/13.01, 13.03, 35; 83/471.1, 471.2, 471.3, 490, 478

(56) References Cited

U.S. PATENT DOCUMENTS

| | | | | |
|---|---|---|---|---|
| 3,205,621 A | * | 9/1965 | Davis et al. ................ | 451/231 |
| 4,782,591 A | * | 11/1988 | DeVito et al. ............. | 30/123.3 |
| 5,675,895 A | * | 10/1997 | Mori et al. ................... | 30/124 |
| 5,676,124 A | * | 10/1997 | Lee .......................... | 125/13.01 |
| 6,478,664 B2 | * | 11/2002 | Brazell ....................... | 451/280 |

* cited by examiner

Primary Examiner—Lee D. Wilson
Assistant Examiner—Anthony Ojini
(74) Attorney, Agent, or Firm—DLA Piper Rudnick Gray Cary US LLP

(57) ABSTRACT

A circular saw includes a worktable, a mounting seat extending upwardly from the worktable for mounting a motor thereon, a blade supporting unit pivotally mounted on the mounting seat at a pivot end so that an opposite free end is turnable to be close to and away from the worktable, and a saw blade shaft mounted rotatably on the blade supporting unit about a blade axis parallel to an output shaft axis of an output shaft of the motor and having a saw blade mounted thereon. The saw blade shaft is coupled to the output shaft by a drive transmitting unit which transmits driving force of the output shaft to the saw blade shaft so as to rotate the saw blade.

9 Claims, 10 Drawing Sheets

US 6,866,568 B1

CIRCULAR SAW

CROSS-REFERENCE TO RELATED APPLICATION

This application claims priority of Taiwanese Application No. 092219290, filed on Oct. 30, 2003.

BACKGROUND OF THE INVENTION

1. Field of the Invention

This invention relates to a circular saw, more particularly to a circular saw which includes a motor that is mounted on a mounting seat extending from a worktable, and a circular saw blade that is pivotally mounted to the mounting seat so as to be turned toward and away from the worktable.

2. Description of the Related Art

Referring to FIG. 1, a conventional circular saw 10 is shown to include a worktable 11, a mounting seat 12 mounted on a rear end of the worktable 11, a blade supporting frame 14 pivotally mounted on the mounting seat 12 by a pivot member 13 at a pivot end such that an opposite free end is turnable toward and away from the worktable 11, a circular saw blade 15 mounted rotatably on the blade supporting frame 14, a motor 16 mounted on the blade supporting frame 14 to drive the saw blade 15, a biasing spring 18 disposed to bias the free end of the blade supporting frame 14 away from the worktable 11, and a dust discharging tube 19 disposed on the blade supporting frame 14. In use, a handle 17 mounted on the free end of the blade supporting frame 14 is depressed toward a workpiece (not shown) on the worktable 11 for sawing the same. However, the motor 16 have to be moved along with the blade supporting frame 14 during the sawing operation, thereby causing inconvenience to the user. In addition, since the blade supporting frame 14 is biased by the biasing spring 18 to move away from the worktable 11, strong vibrations may occur to result in damage the motor 16 and the saw blade 15. Furthermore, the circular saw 10 has only a single sawing function.

SUMMARY OF THE INVENTION

The object of the present invention is to provide a circular saw which can be operated in a convenient and effort-saving manner.

Another object of the present invention is to provide a circular saw which can prevent damage to component parts during sawing operation.

Still another object of the present invention is to provide a circular saw which has a grinding function.

According to this invention, the circular saw includes a worktable having front and rear ends opposite to each other in a longitudinal direction, and a mounting seat extending from the rear end of the worktable upwardly and having a top end distal from the rear end. A blade supporting unit includes a pivot end which is pivotally connected to the top end about a pivot axis in a transverse direction relative to the longitudinal direction, a free end which is turnable about the pivot axis to be close to and away from the front end of the worktable, and a middle mounting portion which is interposed between the pivot end and the free end. A motor is mounted securely on the mounting seat, and has an output shaft which extends along an output shaft axis that is parallel to the pivot axis for delivering a driving force. A saw blade shaft is mounted on and is rotatable relative to the middle mounting portion of the blade supporting unit about a blade axis parallel to the output shaft axis, and has a driven end which is disposed laterally of the middle mounting portion, and a coupling end which is opposite to the driven end along the blade axis such that a saw blade is mounted on and is rotated with the coupling end of the saw blade shaft. A drive transmission unit is disposed to transmit the driving force of the output shaft to the driven end of the saw blade shaft so as to rotate the saw blade about the blade axis.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
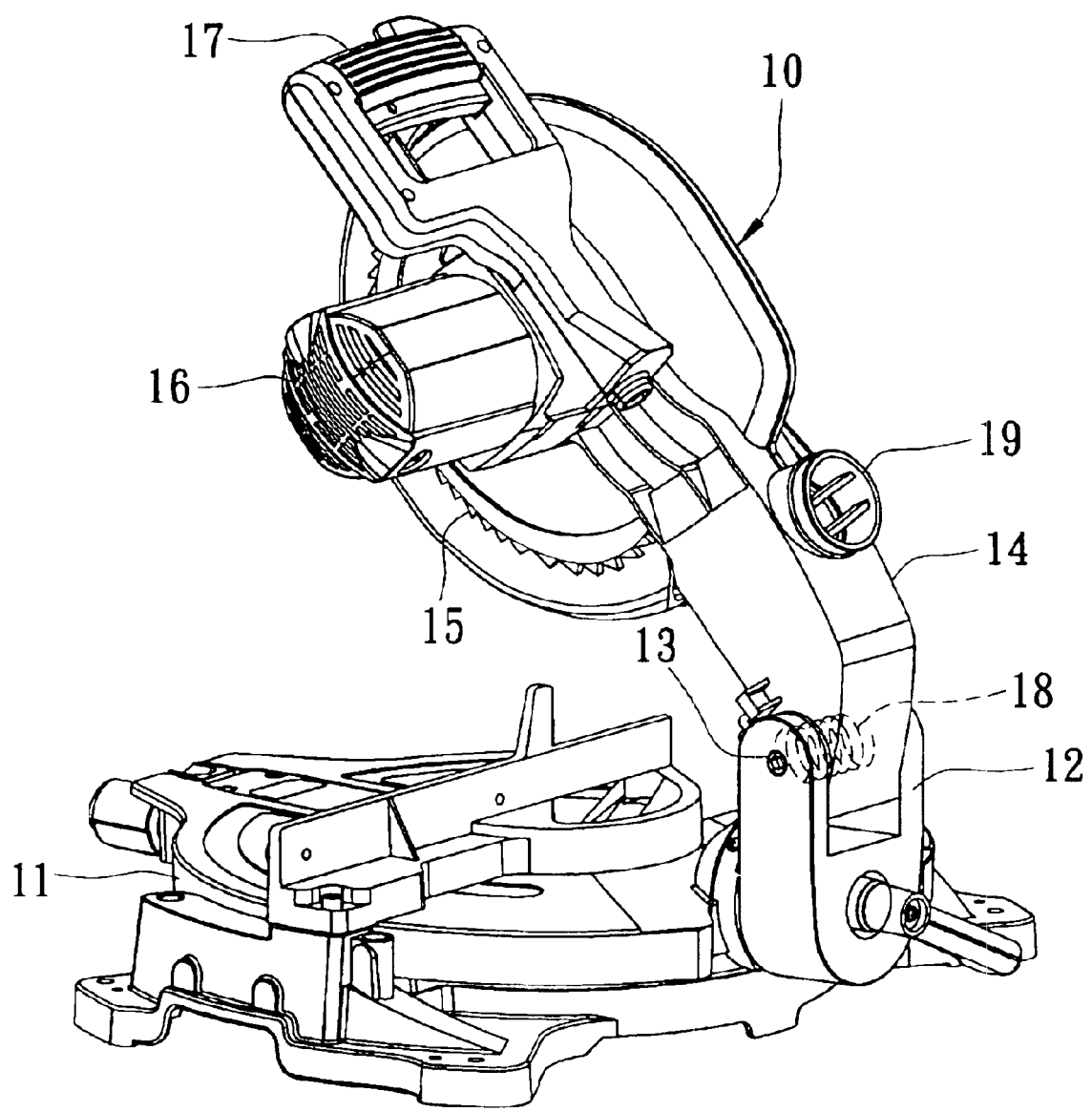
FIG. 1 is a perspective view of a conventional circular saw.

Before the present invention is described in greater detail, it should be noted that same reference numerals have been used to denote like elements throughout the specification.

Referring to FIGS. 2 to 5, the preferred embodiment of a circular saw according to the present invention is shown to comprise a worktable 20 having front and rear ends 202,201 opposite to each other in a longitudinal direction, a mounting seat 21 extending from the rear end 201 of the worktable 20 upwardly, a blade supporting unit 30, a driving unit 40, a drive transmission unit 50, a dust collecting unit 60, a grinding unit 70, a damper unit 80, and a blade guarding unit 90.

The mounting seat 21 includes a seat body 22, a pivot shaft 23, and a restricting rod 25. The seat body 22 includes a bottom portion 221, a pair of side plates 222,223 extending upwardly from the bottom portion 221, and a blocking portion 224 interposed between the side plates 222,223. The pivot shaft 23 is secured on top ends of the side plates 222,223, extends along a pivot axis in a transverse direction relative to the longitudinal direction, and has two shaft ends 231,232 extending outwardly of the side plates 222,223, respectively. The restricting rod 25 is secured on the blocking portion 224.

The blade supporting unit 30 includes two pivot ends 311,321 which are sleeved on the pivot shaft 23 and which are pivotally connected to the mounting seat 21 about the pivot axis, two free ends 312,322 which are opposite to the pivot ends 311,321, respectively, and a middle mounting portion which is interposed between the pivot ends 311,321 and the free ends 312,322 and which includes right and left support walls 31,32 spaced apart from each other in the transverse direction by screw fasteners 33 for receiving a circular saw blade 34 therebetween. A handle 35 is secured on the free end 322. In assembly, the pivot ends 311,321 are disposed between the side plates 222,223. A biasing member 24, such as a torsion spring, is disposed between the pivot ends 311,321, and has two ends 241,242 respectively abutting against a boss 26 on the pivot end 311 and the blocking portion 224. The pivot shaft 23 then passes through the side plates 222,223, the biasing member 24 and the pivot ends 311,321. As such, the free ends 312,322 are turnable about the pivot axis to first and second positions to be close to and away from the front end 201 of the worktable 20, respectively. The biasing member 24 can bias the free ends 312,322 to the second position to be away from the front end 201 of the worktable 20 so as to urge the saw blade 34 to move away from the worktable 20.

The driving unit 40 includes a mounting plate 41 which is secured on the outer side of the side plate 223, and a motor 42 which is spaced apart from and which is secured to the mounting plate 41 by screw fasteners 431 that pass through lugs 423 on the motor 42 and sleeve tubes 432 and that engage threadedly the mounting plate 41. The motor 42 has an output shaft 422 which extends along an output shaft axis that is parallel to the pivot axis of the pivot shaft 23 to deliver a driving force. In this embodiment, the output shaft axis is aligned with the pivot axis.

A saw blade shaft 54 is mounted on and is rotatable relative to the left support wall 32 by a bearing seat 52 about a blade axis parallel to the output shaft axis, and has a driven end 542 which is disposed leftwardly and outwardly of the left support wall 32, and a coupling end 541 which is opposite to the driven end 542 along the blade axis such that the saw blade 34 is mounted on and is rotated with the coupling end 541.

The drive transmission unit 50 includes a transmitting shaft 53 and a transmitting member. The transmitting shaft 53 is mounted on and is rotatable relative to the left support wall 32 by a bearing seat 51 about a driven axis parallel to the blade axis, and has a transmitting end 532 which is disposed leftwardly and outwardly of the left support wall 32, and a driving end 531 which is opposite to the transmitting end 532 along the driven axis and which extends laterally and outwardly of the right support wall 31. The transmitting end 532 is coupled with a pulley 56. A belt 58 is trained on the pulley 56 and a pulley 55 on the output shaft 422 so as to transmit the driving force of the output shaft 422 to rotate the transmitting shaft 53 about the driven axis. The transmitting member includes a pulley 57 which is coupled with the driven end 542 of the saw blade shaft 54, and a belt 59 which is trained on the pulleys 56,57 such that rotational force of the transmitting shaft 53 is transmitted to rotate the saw blade shaft 54 about the blade axis, thereby rotating the saw blade 34 for a sawing operation. As illustrated, referring to FIG. 6, when the motor 42 is actuated, the transmitting shaft 53, the saw blade shaft 54 and the saw blade 34 are rotated simultaneously.

The dust collecting unit 60 includes a barrier plate 61 which is disposed between the right and left support walls 31,32 above the saw blade shaft 54 and the transmitting shaft 53 to confine a dust collecting space, a first housing wall 63 which is disposed on the right support wall 31, which surrounds the driving end 531 of the transmitting shaft 53, which is communicated with the dust collecting space by an inlet hole 62, and which has an outlet port 631 extending radially, an impeller 64 which is mounted on and which is rotated with the driving end 531 of the transmitting shaft 53, a cover plate 65 which is secured to and which covers the first housing wall 63, and a dust discharging member 66 which is secured between the right and left support walls 31,32 and which is connected to the outlet port 631. When the dust collecting unit 60 is turned with the blade supporting unit 30 to a predetermined position, the barrier plate 61 is restricted by the restricting rod 25, thereby retaining the blade supporting unit 30.

The grinding unit 70 includes a grinding wheel member 72, a dust collecting member 71, and a working table member 73. The grinding wheel member 72 includes a grinding wheel 721 which is mounted on and which is rotated with the driving end 531 of the transmitting shaft 53 about the driven axis, and sandpaper 722 which is attached to an outer surface of the grinding wheel 721. The dust collecting member 71 includes a surrounding wall 711 which is secured on the cover plate 65 to surround the grinding wheel member 72 and which has a dust inlet 712, a dust outlet 714 which is secured on the right support wall 31 and which has an outlet hole 713 aligned with the dust inlet 712, and a protective plate 74 which is secured to the surrounding wall 711 by means of screw fasteners 75. Dust produced during grinding operation of the grinding wheel member 72 can be collected for discharge through the dust outlet 714. Alternatively, if the dust collecting unit 60 is not provided, the surrounding wall 711 can be secured on the right support wall 31 to surround the driving end 531 of the transmitting shaft 53.

The working table member 73 has a connected end 731 which is sleeved on and which is angularly adjustable relative to the shaft end 231 of the pivot shaft 23 about the pivot axis, a support post 732 which extends from the connected end 731, and a table wall 733 which is connected pivotally to the support post 732, which extends in the longitudinal direction, and which is disposed proximate to the grinding wheel member 72 so as to support a workpiece to be ground by the grinding wheel member 72. A fastening member includes a bearing plate 734 with an arcuate hole 735 such that a threaded bolt 736 passes through the arcuate hole 735 and engages threadedly the support post 732 so as to enable the bearing plate 734 to retain the table wall 733 relative to the grinding wheel member 72.

Figure 4:
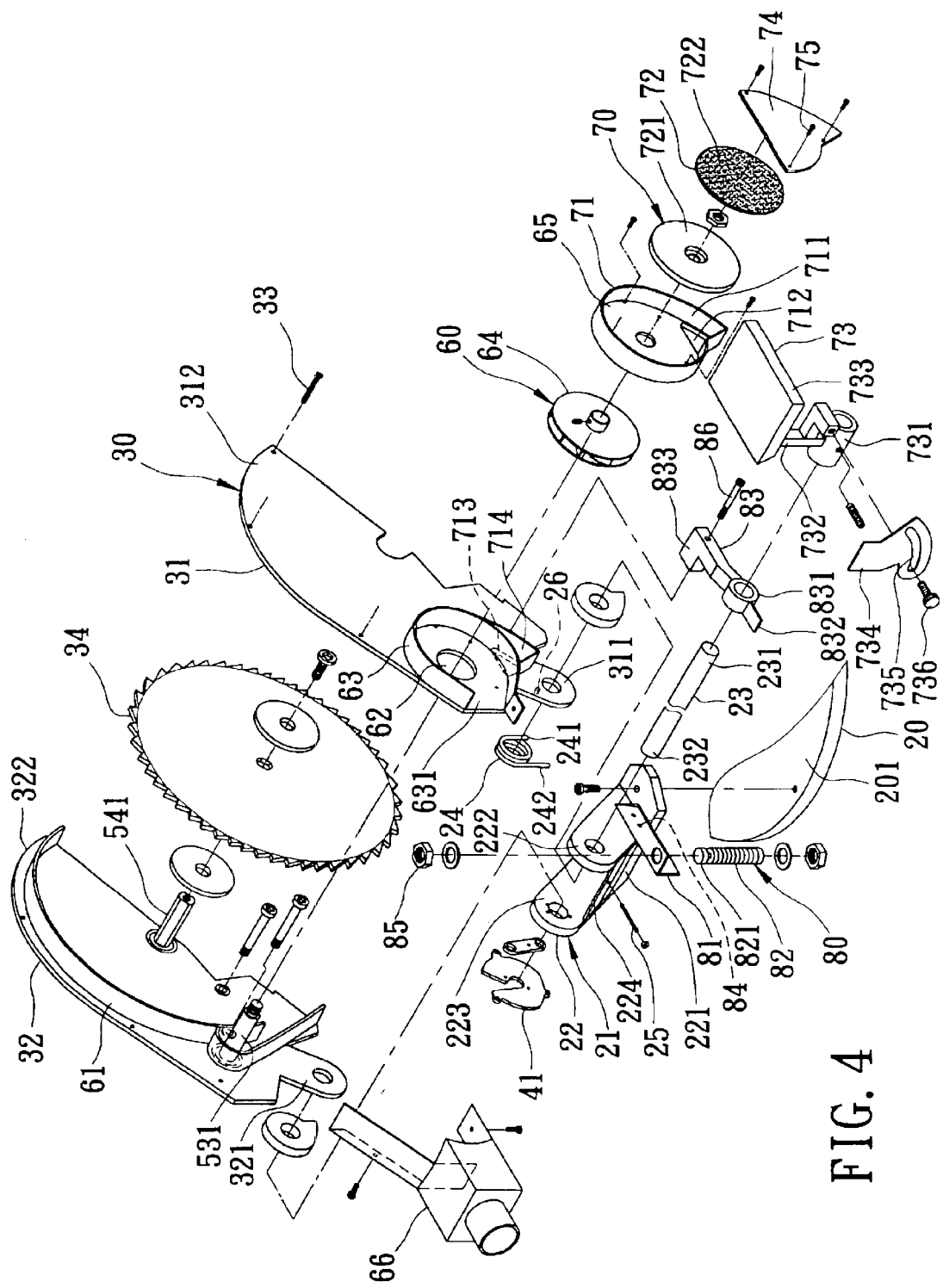
FIG. 4 is an exploded perspective view of a right part of the preferred embodiment.
Figure 5:
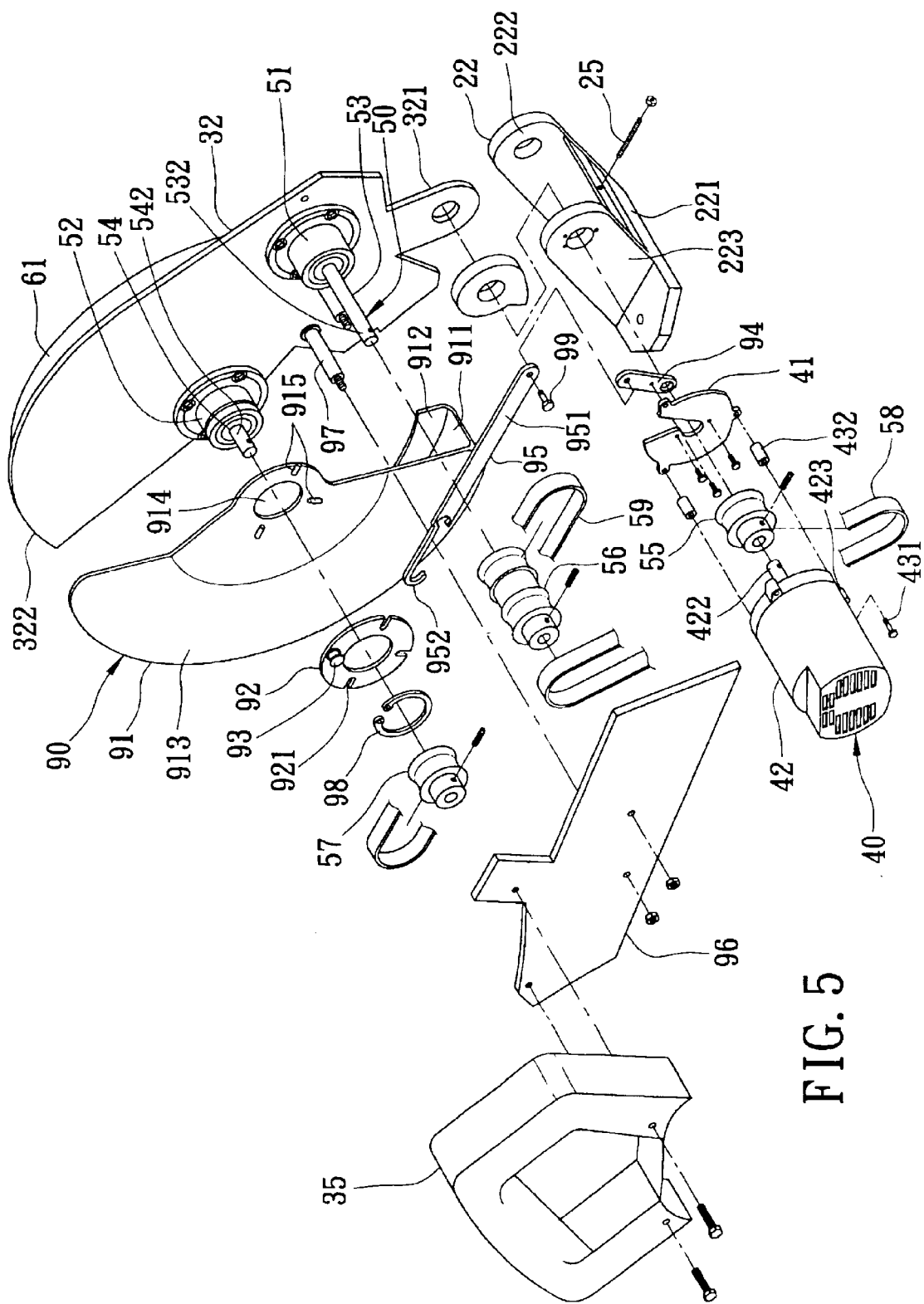
FIG. 5 is an exploded perspective view of a left part of the preferred embodiment.
Figure 6:
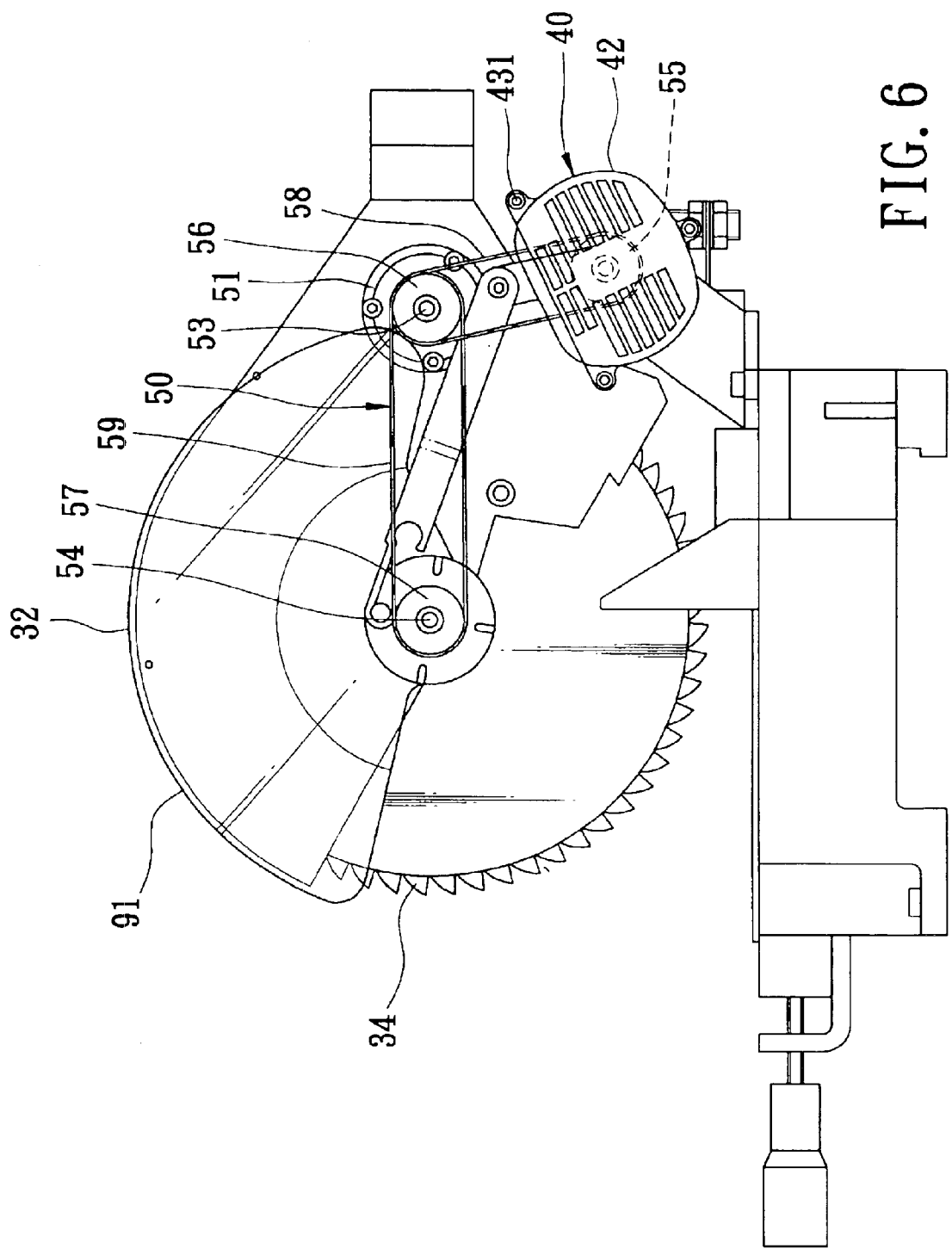
FIG. 6 is a fragmentary left view of the preferred embodiment, showing a driving transmission unit.

As shown in FIGS. 4 to 6, when the motor 42 is actuated, the transmitting shaft 53 and the saw blade shaft 54 are rotated so as to rotate the saw blade 34, the grinding wheel member 72 and the impeller 64 for performing sawing, grinding and dust collecting operations simultaneously.

Figure 2:
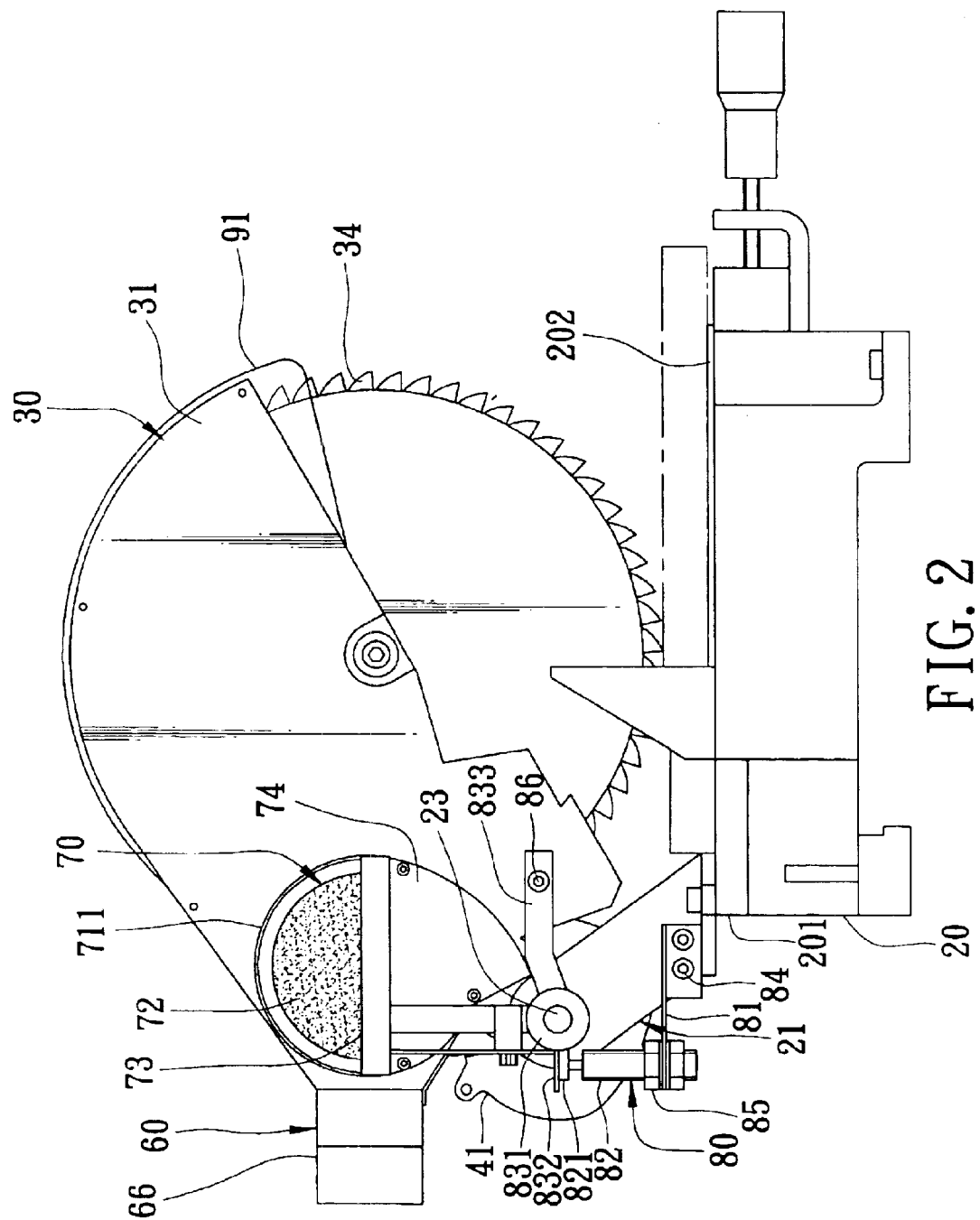
FIG. 2 is a right side schematic view of the preferred embodiment of a circular saw according to this invention.
Figure 3:
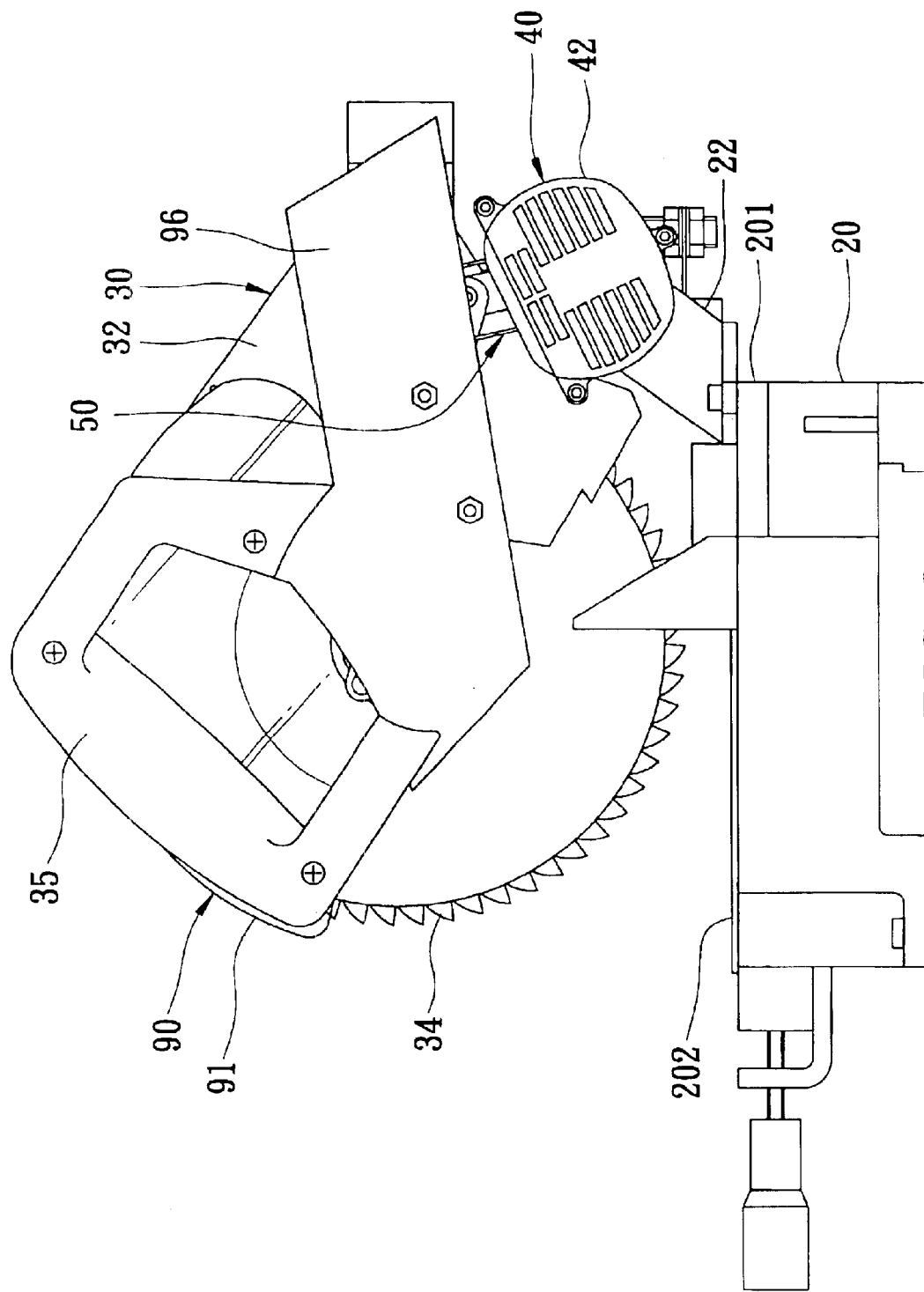
FIG. 3 is a left side schematic view of the preferred embodiment.

Referring to FIGS. 2 and 4, the damper unit 80 includes a mounting seat 81 which is secured to the side plate 222 by fasteners 84, a cushioning member 82 which has a lower mounting end secured to the mounting seat 81 by fasteners 85, and an upper depressable end 821, and a coupling lever 83 which is pivotally mounted on the shaft end 231 of the pivot shaft 23 about the pivot axis at a pivot sleeve 831. The coupling lever 83 has a depressing end 832 connected to the upper depressable end 821 of the cushioning member 82, and a weight end 833 disposed opposite to the depressing end 832 and connected to the right support wall 31 of the blade supporting unit 30 by a fastener 86. As such, when the free ends 312,322 of the blade supporting unit 30 are turned to the second position to be away from the front end 202 of the worktable 20 by a biasing force of the biasing member 24, the depressing end 832 depresses the upper depressable end 821 to acquire a cushioning force against the biasing force, thereby lessening the biasing force of the biasing member 24 so as to prevent abrupt movement of the saw blade 34 away from the worktable 20. Thus, vibration of the blade supporting unit 30 and the saw blade 34 can be prevented.

Figure 7:
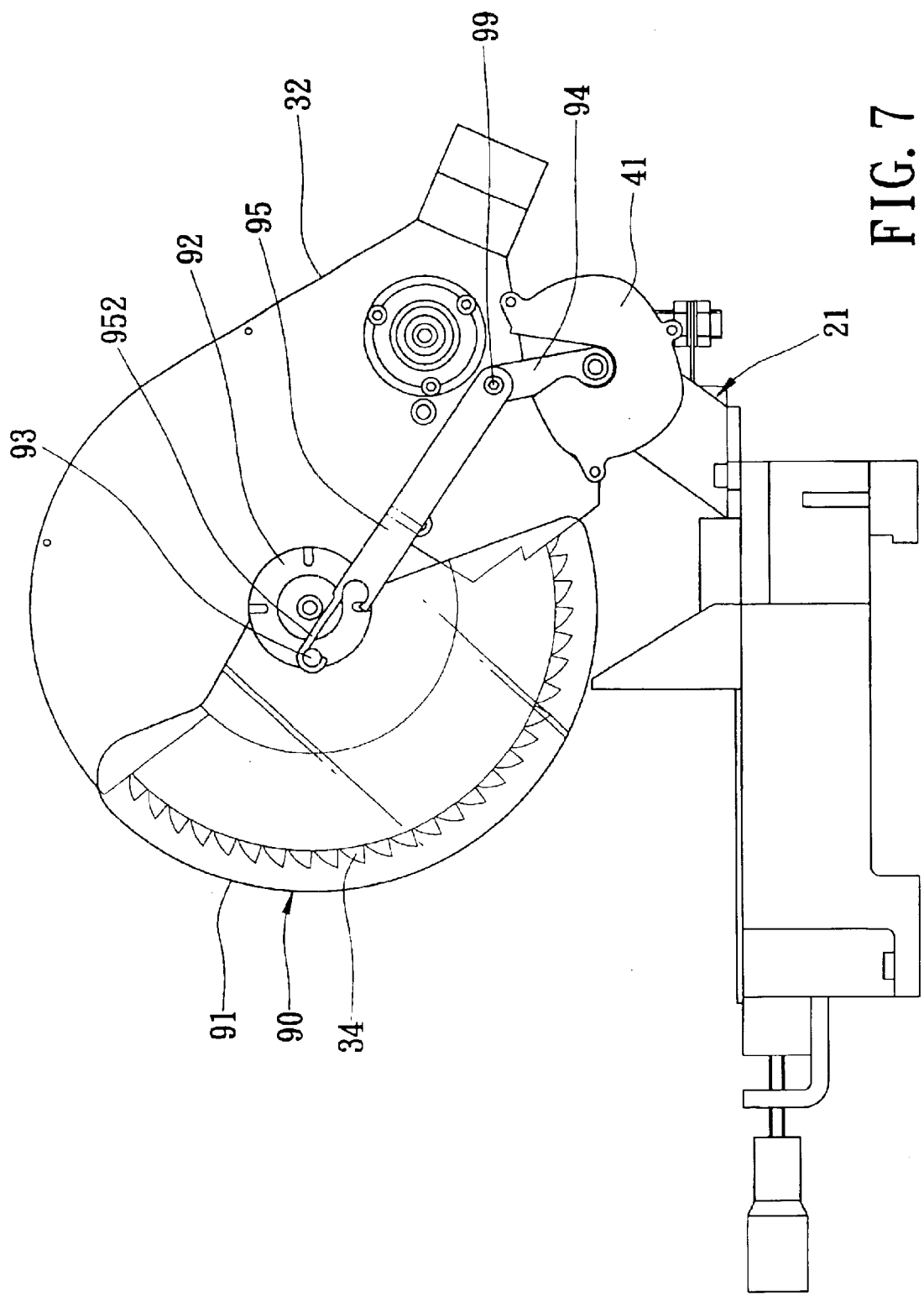
FIG. 7 is a fragmentary left view of the preferred embodiment, showing a blade supporting unit in a first position, and a blade guard in a lower position.
Figure 8:
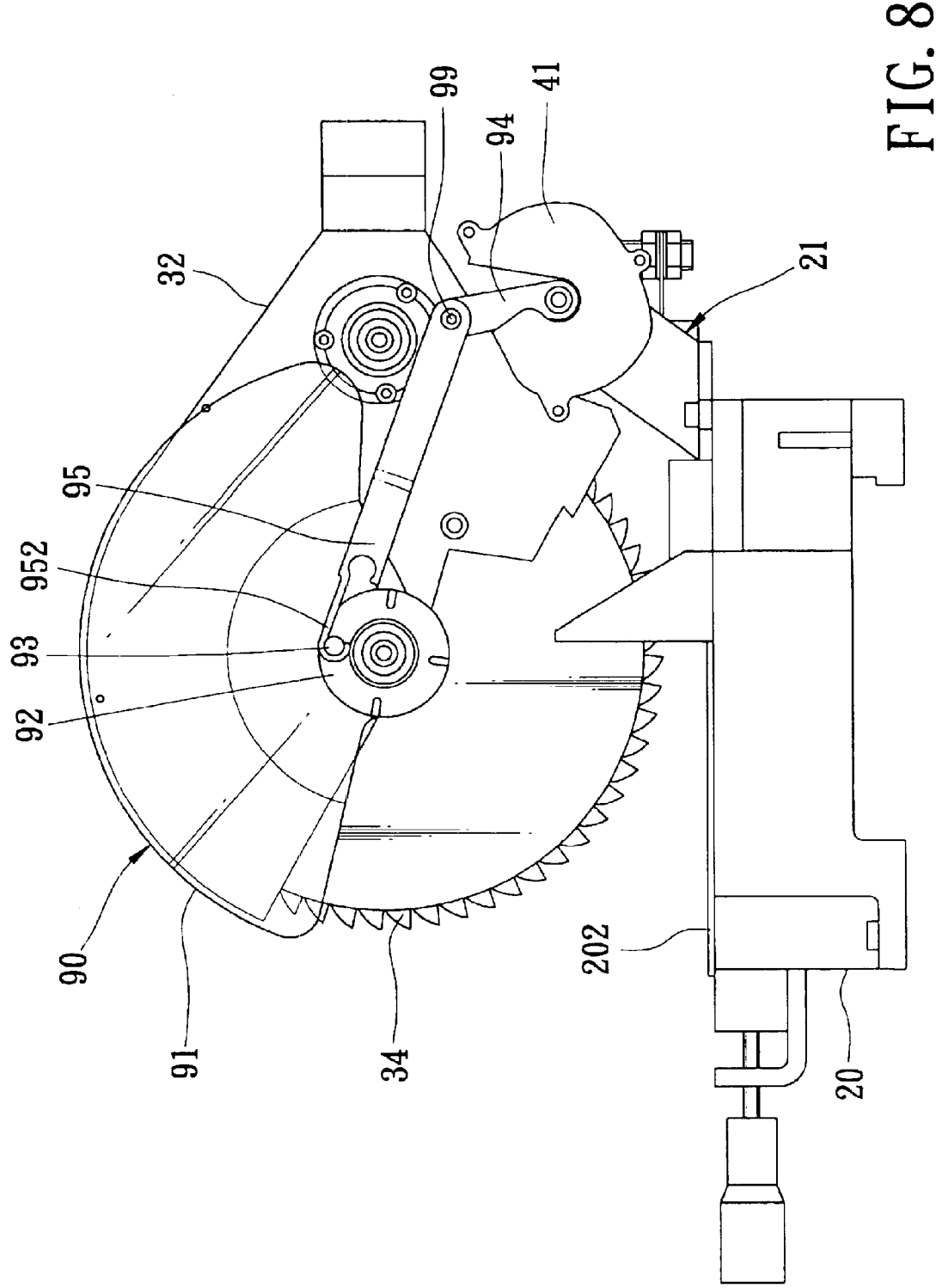
FIG. 8 is a fragmentary left view similar to FIG. 7, but showing the blade supporting unit in a second position, and the blade guard in an upper position.

Referring to FIGS. 5, 7 and 8, the blade guarding unit 90 includes a blade guard 91 which has a sleeve hole 914 for sleeving of the blade guard 91 on the bearing seat 52 so as to be mounted leftwardly and outwardly of the left support wall 32, and which is configured to be turnable about the blade axis between a lower position to shield a lower running portion of the saw blade 34 (see FIG. 7), and an upper position to expose the lower running portion of the saw blade 34 (see FIG. 6). The blade guard 91 includes two wings 913,912 and an interconnecting portion 911 disposed therebetween. A rotary plate 92 is mounted securely on the blade guard 91 to be turnable with the blade guard 91 in a manner that protrusions 915 formed on the blade guard 91 engage slits 921 formed in the rotary plate 92. A snap member 98 is disposed to prevent removal of the rotary plate 92 and the blade guard 91 from the bearing seat 52. An anchor arm 95 has a pivot end 951 which is pivoted to a pivot plate 94 secured on the side plate 223 by a pin 99 about a linking axis parallel to the pivot axis, and an anchor end 952 opposite to the pivot end 951. A stem 93 is disposed on the rotary plate 92 so as to engage the anchor end 952 of the anchor arm 95, and is offset from the blade axis. A protective plate 96 is secured to the left support wall 32 by two fasteners 97 so as to shield the drive transmission unit 50.

When the saw blade shaft 54 is moved with the free ends 312,322 of the blade supporting unit 30 to be close to the front end 202 of the worktable 20 by pulling the handle 35 (see FIG. 3), as shown in FIG. 8, the stem 93 is turned about the blade axis by a torque generated as a result of the engagement of the stem 93 with the anchor end 952 of the anchor arm 95, thereby resulting in sweeping of the blade guard 91 from the lower position to the upper position so as to expose the lower running portion of the saw blade 34. Note that the handle 35 may also be disposed on the protective plate 96. When the blade supporting unit 30 is placed in the second position in a non-use state, the blade guard 91 is in the lower position by virtue of the weight thereof, as shown in FIG. 7, thereby shielding the lower running portion of the saw blade 34.

Figure 9:
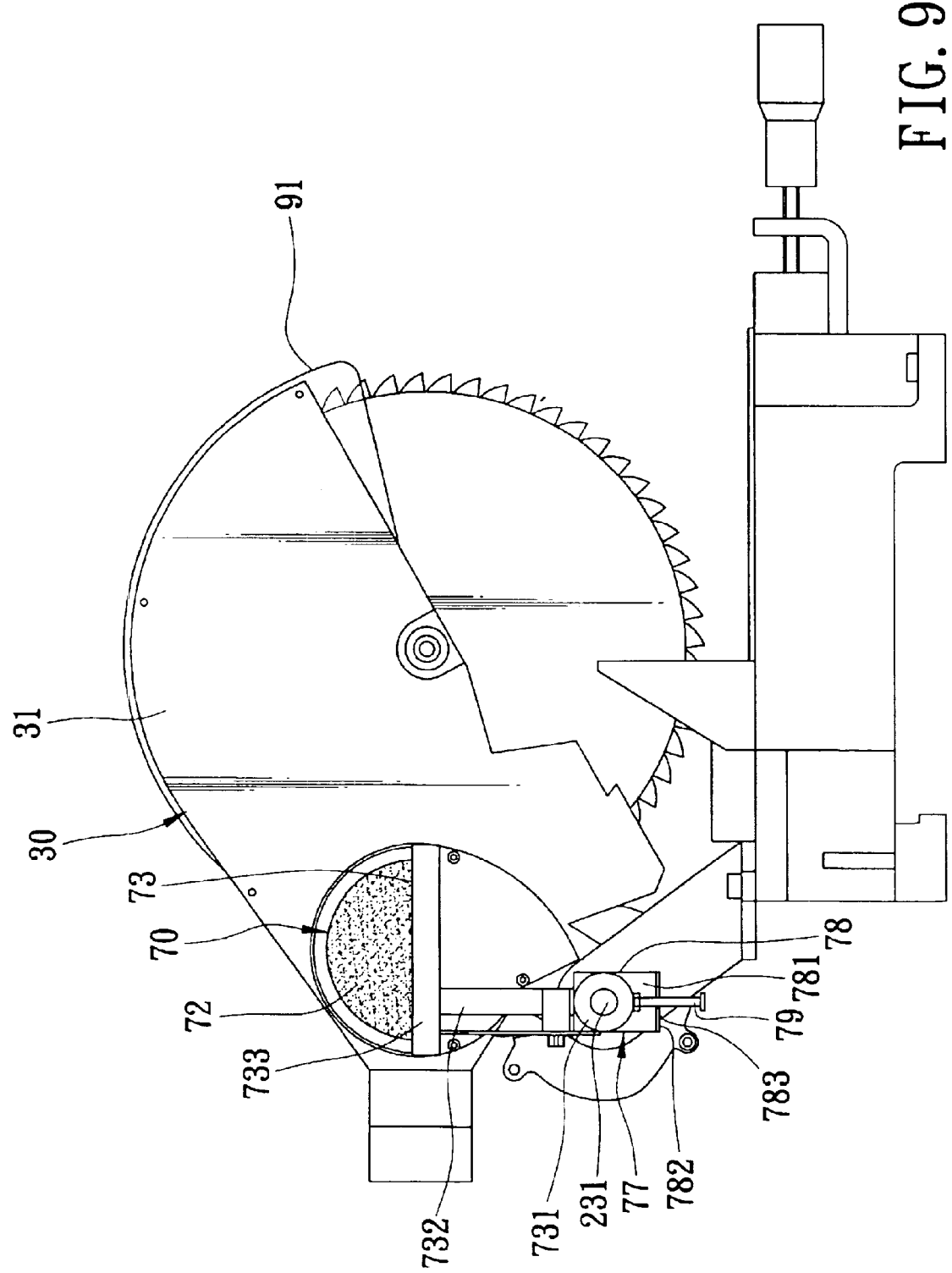
FIG. 9 is a right side schematic view of another preferred embodiment of a circular saw according to this invention.
Figure 10:
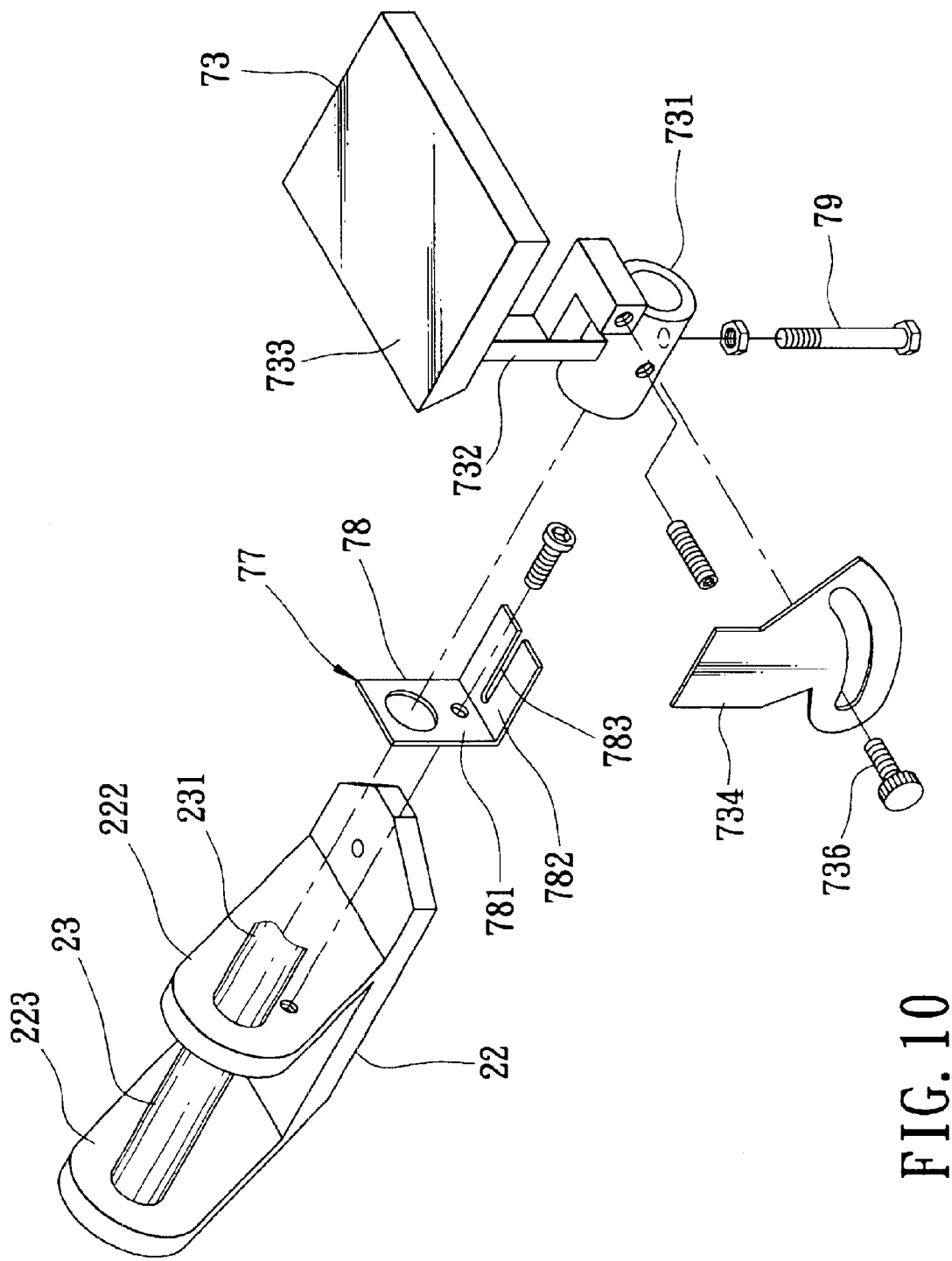
FIG. 10 is an exploded perspective view of an aligning unit of the embodiment shown in FIG. 9.

Referring to FIGS. 9 and 10, when the damper unit 80 is not provided, the grinding unit 70 can further include an aligning member 77. The aligning member 77 includes an L-shaped plate 78 having an upright plate portion 781 which is secured to the shaft end 231 of the pivot shaft 23, and a horizontal plate portion 782 which extends perpendicularly to the upright plate portion 781, which is disposed under the connected end 731 of the working table member 73, and which has a slit 783, and a positioning bolt 79 with a threaded end that passes through the slit 783 and that is engaged threadedly in the connected end 731 so as to guard against turning movement of the working table member 73 relative to the pivot shaft 23. As such, the table wall 733 of the working table member 73 is kept perpendicular to the grinding wheel member 72.

As illustrated, since the motor 42 is mounted on the mounting seat 21 and is not turned with the blade supporting unit 30, the sawing operation of the saw blade 34 is convenient and effort-saving to conduct. In addition, by virtue of the damper unit 80, abrupt movement of the blade supporting unit 30 can be prevented when the blade supporting unit 30 is moved away from the front end 202 of the worktable 20 by the biasing force of the biasing member 24, thereby preventing vibration of the component parts of the blade supporting unit 30. Moreover, by virtue of the grinding unit 70 that is driven by the motor 42, the circular saw of this invention can additional have a grinding function. Furthermore, by virtue of the aligning member 77, the table wall 733 of the working table member 73 is kept perpendicular to the grinding wheel member 72.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A circular saw comprising:
   a worktable having front and rear ends opposite to each other in a longitudinal direction;
   a mounting seat extending from said rear end of said worktable upwardly, and having a top end distal from said rear end;
   a blade supporting unit including a pivot end which is pivotally connected to said top end about a pivot axis in a transverse direction relative to the longitudinal direction, a free end which is turnable about the pivot axis to be close to and away from said front end of said worktable, and a middle mounting portion which is interposed between said pivot end and said free end;
   a motor mounted securely on said mounting seat, and having an output shaft which extends along an output shaft axis that is parallel to the pivot axis for delivering a driving force;
   a saw blade shaft mounted on and rotatable relative to said middle mounting portion of said blade supporting unit about a blade axis parallel to the output shaft axis, and having a driven end which is disposed laterally of said middle mounting portion, and a coupling end which is opposite to said driven end along the blade axis;
   a saw blade mounted on and rotated with said coupling end of said saw blade shaft; and
   a drive transmission unit disposed to transmit the driving force of said output shaft to said driven end of said saw blade shaft so as to rotate said saw blade about the blade axis.

2. The circular saw of claim 1, wherein said output shaft axis is aligned with the pivot axis.

3. The circular saw of claim 2, wherein said middle mounting portion of said blade supporting unit includes right and left support walls spaced apart from each other in the transverse direction for receiving said saw blade therebetween, said driven end of said saw blade shaft extending leftwardly and outwardly of said left support wall, said driving transmission unit including
   a transmitting shaft mounted on and rotatable relative to said blade supporting unit about a driven axis parallel to the blade axis, and having a transmitting end which is disposed leftwardly and outwardly of said left support wall and which is driven by said output shaft of said motor, and a driving end which is opposite to said transmitting end along the driven axis and which extends laterally and outwardly of said right support wall, and
   a transmitting member disposed to transmit rotational force of said transmitting shaft to rotate said saw blade shaft.

4. The circular saw of claim 3, wherein said top end of said mounting seat has a pivot shaft extending along the pivot axis, said circular saw further comprising a grinding unit that includes:
- a grinding wheel member mounted on and rotated with said driving end of said transmitting shaft about the driven axis;
- a dust collecting member secured to said right support wall in the vicinity of said grinding wheel member for collecting dust during grinding; and
- a working table member having a connected end which is mounted on and which is angularly adjustable relative to said pivot shaft, and a table wall which is connected to said connected end, which extends in the longitudinal direction, and which is disposed proximate to said grinding wheel member so as to support a workpiece to be ground by said grinding wheel member.

5. The circular saw of claim 4, wherein said connected end of said working table member is turnable relative to said pivot shaft about the pivot axis, said grinding unit further including a fastening member to lock said working table member from movement relative to said grinding wheel member once said connected end is adjusted angularly.

6. The circular saw of claim 5, wherein said grinding unit further includes an L-shaped plate having an upright plate portion which is secured to said pivot shaft, and a horizontal plate portion which extends perpendicularly to said upright plate portion, which is disposed under said connected end of said working table member, and which has a slit, and a positioning bolt with a threaded end that passes through said slit and that is engaged threadedly in said connected end so as to guard against turning movement of said working table member relative to said pivot shaft.

7. The circular saw of claim 3, further comprising
- a blade guard which is mounted on said driven end of said sawblade shaft leftwardly and outwardly of said left support wall, which is configured to shield a lower running portion of said saw blade when said blade guard is placed in a lower position, and which is turnable about the blade axis,
- a rotary plate which is mounted securely on said blade guard to be turnable with said blade guard,
- an anchor arm which has a pivot end pivoted to said mounting seat about a linking axis parallel to the pivot axis, and an anchor end opposite to said pivot end, and
- a stem which is disposed on said rotary plate so as to engage said anchor end of said anchor arm, and which is offset from the blade axis such that, when said saw blade shaft is moved with movement of said free end of said blade supporting unit to be close to said front end of said worktable, said stem is turned about the blade axis by a torque generated as a result of the engagement of said stem with said anchor end of said anchor arm, thereby resulting in sweeping of said blade guard from the lower position to an upper position, where said lower running portion of said saw blade is exposed.

8. The circular saw of claim 2, further comprising:
- a biasing member disposed to bias said free end of said blade supporting unit to turn away from said front end of said worktable so as to urge said saw blade to move away from said worktable; and
- a damper unit disposed to lessen biasing force of said biasing member so as to prevent abrupt movement of said saw blade away from said worktable.

9. The circular saw of claim 8, wherein said damper unit includes
- a cushioning member having a lower mounting end which is secured to said mounting seat, and an upper depressable end which is depressable to acquire a cushioning force against the biasing force, and
- a coupling lever pivotally mounted on said upper end of said mounting seat about the pivot axis, a depressing end connected to said upper depressable end, and a weight end disposed opposite to said depressing end and connected to said middle mounting portion of said blade supporting unit such that when said free end of said blade supporting unit is turned away from said front end of said worktable by a biasing force of said biasing member, said depressing end depresses said upper depressable end to acquire the cushioning force against the biasing force.

* * * * *